United States Patent [19]

Yasue et al.

[11] Patent Number: 5,043,385

[45] Date of Patent: Aug. 27, 1991

[54] IMPACT RESISTANT RESIN COMPOSITION

[75] Inventors: Kenji Yasue; Takeshi Marutani; Yasumasa Fukushima; Takashi Ida, all of Uji, Japan

[73] Assignee: Stamicarbon B.V., Geleen, Netherlands

[21] Appl. No.: 546,699

[22] Filed: Jul. 2, 1990

Related U.S. Application Data

[63] Continuation of Ser. No. 224,908, Jul. 27, 1988, abandoned.

[30] Foreign Application Priority Data

Jul. 27, 1987 [JP] Japan ................. 62-188196

[51] Int. Cl.$^5$ .................................. C08L 77/00
[52] U.S. Cl. ................................. 525/66; 525/92; 525/179
[58] Field of Search ................. 525/66, 179, 92

[56] References Cited

U.S. PATENT DOCUMENTS 3,676,400 7/1972 Kohan et al. ................. 525/183

FOREIGN PATENT DOCUMENTS 0247357 12/1987 European Pat. Off. .

Primary Examiner—Ana L. Carrillo
Attorney, Agent, or Firm—Cushman, Darby & Cushman

[57] ABSTRACT

An impact resistant resin composition comprising from 30 to 70% (wt) of a polyamide with at least 40 mol/$10^6$ g amino groups, from 5 to 40% (wt) of a polyarylate, from 5 to 40% by weight of the adduct of an unsaturated dicarboxylic acid anhydride and a butadiene copolymer with at least one monomer from the group of aromatic vinylmonomer, an unsaturated nitrile monomer and an acrylate monomer, and from 3 to 30% (wt) of an epoxy group-containing olefine copolymer obtained by copolymerizing at least one unsaturated glycidyl monomer with at least one unsaturated olefin monomer.

6 Claims, No Drawings

IMPACT RESISTANT RESIN COMPOSITION

This is a continuation of applicsation Ser. No. 07/224,908 filed on July 27, 1988, now abandoned.

BACKGROUND OF THE INVENTION

The present invention relates to a novel resin composition having excellent impact strength and good heat and chemical resistance and moldability. More particularly, it relates to a resin composition which comprises a polyamide, a polyarylate, a butadiene copolymer obtained by an addition of an unsaturated dicarboxylic acid anhydride, and an epoxy group-containing olefin copolymer.

The resin composition of the present invention is expected to be used for automobile parts, particularly exterior plates or external parts of automobiles and for general mechanical parts, by virtue of its excellent impact resistance, chemical resistance, heat resistance and moldability.

A resin composition comprising a polyarylate and a polyamide, or a polyarylate, a polyamide and a polyester, is known. For example, Japanese Examined Patent Publication No. 50260/1983 discloses the properties of a three component resin composition comprising a polyarylate, a polyamide, and a polyester or a polyesterether.

Further, the Japanese Unexamined Patent Publications No. 100552/1977 and No. 100553/1977 disclose processes for its production. The Japanese Unexamined Patent Publication No. 94366/1978 discloses a method for imparting flame retardancy thereto.

A resin composition comprising a polyarylate and a polyamide (if necessary, further containing a polyester or a polyesterether) is excellent not only in chemical resistance and heat resistance, but also in moldability, and it is used primarily in electric and electronic applications. The polyarylate obtainable from bisphenol A and a phthalic acid mixture comprising terephthalic acid and isophthalic acid, has excellent heat resistance, but as is well known, its chemical resistance is not adequate and environmental stress cracks are likely to form. Further, its moldability is not good. On the other hand, a resin composition comprising 30% by weight of this polyarylate, 50% by weight of nylon 6 and 20% by weight of a polyethylene terephthalate, has excellent chemical resistance, and its heat distortion temperature is also high at a level of 160° C. The moldability is about ten times superior to the polyarylate alone, as evaluated by a spiral flow test. By virtue of such properties, this resin composition is widely used in electric and electronic applications.

However, the impact strength of the resin composition comprising a polyarylate and a polyamide (optionally further containing a polyester or a polyesterether) is not necessarily adequate. For instance, in the case of a resin composition comprising 50% by weight of a polyarylate and 50% by weight of nylon 6, the Izod impact strength is 7 kg.cm/cm, which is relatively low for an engineering plastic. Therefore, its use has been rather limited. For example, when the resin composition is used for an external plate or exterior part of an automobile, the Izod impact strength is required to be at least 20 kg.cm/cm. Under these circumstances, the application of said resin to an external plate or exterior part of an automobile has been hindered by the inadequate impact resistance in spite of the excellent chemical resistance, heat resistance and moldability. Therefore, it has been expected that if the impact resistance of said resin composition can be improved, its application will remarkably expand not only in the field of external plates and exterior parts for automobiles but also in other fields.

In an attempt to improve the impact resistance of said resin composition, it has been proposed to incorporate either an elastomer in Japanese Unexamined patent Publication No. 56652/1979, an ionomer in Japanese Unexamined Patent Publication No. 93043/1974, a sulfonic acid group-containing polyethylene terephthlate in Japanese Unexamined Patent Publication No. 105050/1984 or an olefin copolymer of a glycidyl ester of an α, β-unsaturated acid in Japanese Unexamined Patent Publication No. 183353/1986.

Further, the present inventors have proposed to incorporate an epoxy group-containing olefin copolymer and an acid anhydride-containing olefin copolymer in the specifications of Japanese Patent Applications No. 119585/1986 and No. 127063/1986.

Such a resin composition comprising a polyamide, a polyarylate, and a toughness imparting material, and having excellent impact strength, heat resistance, and moldability, is expected to be useful for exterior plates and external parts of automobiles or the like.

Further, in such fields of application, cost for materials of the resin composition are an important problem in addition to the physical properties of the resin composition, and many attempts to reduce the costs for materials have been made. In a resin composition comprising a polyamide, a polyarylate, and a toughness imparting material, the polyarylate is relatively expensive. Therefore, in order to reduce the costs for materials of the resin compositions, it is necessary to reduce the blending ratio of the polyarylate or to replace part of the polyarylate with other relatively cheap materials.

However, if the blending ratio of the polyarylate is reduced, the deterioration of heat resistance is substantial, and if a part of the polyarylate is replaced with an ABS resin or a polyethylene terephthalate, the deterioration of impact resistance is substantial.

SUMMARY OF THE INVENTION

Under these circumstances, it is an object of the present invention to reduce the polyarylate content of the resin composition comprising a polyamide, a polyarylate, and a toughness imparting material without deteriorating its excellent impact strength, heat resistance, chemical resistance, and moldability.

The present inventors have conducted extensive research with such an object, and as a result, have found a resin composition which comprises (A) from 30 to 70% by weight of a polyamide containing at least 40 mol/$10^6$ g of an amino group, (B) from 5 to 40% weight of a polyarylate, (C) from 5 to 40% by weight of a butadiene copolymer obtained by an addition of an unsaturated dicarboxylic acid anhydride to a copolymer of butadiene with at least one monomer selected from the group consisting of an aromatic vinyl monomer, an unsaturated nitrile monomer, and an acrylate monomer, and (D) from 3 to 30% by weight of an epoxy group-containing olefin copolymer obtained by copolymerizing at least one unsaturated glycidyl monomer with at least one unsaturated olefin monomer.

DETAILED DESCRIPTION OF THE INVENTION

The polyamide useful for the present invention is represented by the formula:

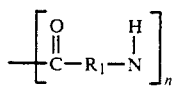
(I)

or the formula:

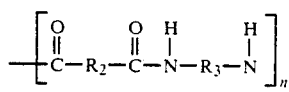
(II)

wherein each of $R_1$, $R_2$ and $R_3$ is a phenylene group or an alkylene group, and n is an integer of at least 20.

The polyamide useful for the present invention includes polymers obtained by the condensation reaction of a diamine with a dibasic acid, by the self-condensation of amino acids and by the polymerization reaction of a lactam.

The polyamide useful for the present invention may be any one of those represented by the above formulas. The polyamide to be used in the present invention may be a copolymer of two or more components. For example, it may be a copolymer of terephthalic acid and/or isophthalic acid with hexamethylenediamine, a copolymer of terephthalic acid and/or isophthalic acid with adipic acid and hexamethylene diamine, a copolymer of terephthalic acid and/or isophthalic acid with 2,2,4-trimethylhexamethylenediamine and/or 2,4,4,-trimethylhexamethylenediamen, a copolymer of terephthalic acid and/or isophthalic acid with bis(4-amino-3-methylcyclohexyl)methane and hexamethylenediamine, a copolymer of terephthalic acid and/or isophthalic acid with bis(4-amino-cylcohexyl)methane and hexamethylenediamine, or a copolymer of terephthalic acid and/or isophthalic acid with bis(4-amino-3-methylcyclohexyl)methane and lauryllactam or caprolactam. Further, the polyamide to be used in the present invention may be of a single type or may be a mixture of two or more different kinds. The most suitable polyamide for use in the present invention is one member or a mixture of two or more members selected from the group consisting of nylon6, nylon66, and nylon46. In order to obtain a resin composition having desirable physical properties, it is preferred to employ a polyamide having an average molecular weight of from 10,000 to 100,000.

The polyamide to be used in the present invention contains at least 40 mol/$10^6$ g, more preferably at least 60 mol/$10^6$ g of an amino group. However, if the polyamide contains more than 120 mol/$10^6$ g of an amino group, the melt viscosity of such resin composition increases substantially, and the moldability deteriorates, these effects being undesirable. Further, where the polyamide contains less than 40 mol/$10^6$ g less than 40 mol/$10^6$ g, the impact strength is inadequate.

The polyarylate useful for the present invention is obtained from a bisphenol of the formula:

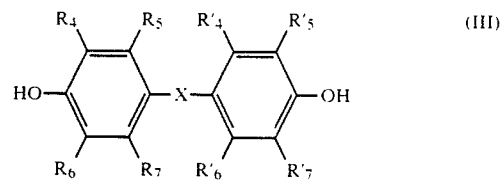
(III)

where —X— is selected from the group consisting of —O—, —S—, $SO_2$—, —CO—, an alkylene group and an alkylidene group, each of $R_4$, $R_5$, $R_6$, $R_7$, $R'_4$, $R'_5$, $R'_6$ and $R'_7$ is selected from the group consisting of a hydrogen atom, a halogen atom and a hydrocarbon group, and terephthalic acid and/or isophthtalic acid, or a functional derivative thereof.

Specific examples of the bisphenol of the above formula include 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)butane, bis(4-hydroxyphenyl)phenylmethane, bis(4-hydroxy-phenyl)diphenylmethane, bis(4-hydroxyphenyl)-4'-methylphenylmethane, 1,1-bis(4-hydroxyphenyl)-2,2,2-trichloroethane, bis(4-hydroxyphenyl)-(4'chlorophenyl)methane, 1,1-bis(4-hydroxyphenyl)cyclohexane, bis(4-hydroxyphenyl)cyclohexamethane and 2,2-bis(4-hydroxynaphthyl)propane. However, a typical bisphenol which is most commonly employed is 2,2-bis(4-hydroxyphenyl)propane, i.e. so-called bisphenol A. If required, a mixture of the above-mentioned bisphenols, or a mixture of such a bisphenol with a small amount of another bivalent compound, such as 2,2'-dihydroxydiphenyl, a dihydroxynaphthalene, hydroquinone, resorcinol, 2,6-dihydroxychlorobenzene, 2,6-dihydroxytoluene or 3,6-dihydroxytoluene, may be used.

The phenylene group of the terephthalic acid or isophthalic acid, or the functional derivative thereof, to be used in the present invention, may be substituted by a halogen atom or an alkyl group. Further, in addition to the terephthalic acid or isophthalic acid, or the functional derivative thereof, a small amount of another aromatic or aliphatic dicarboxylic acid or a functional derivative thereof may be used as a copolymer component.

The polyarylate useful for the present invention can be prepared by any optional method such as interfacial polymerization, solution polymerization, or melt polymerization. In order to obtain a resin composition having desirable physical properties, it is preferred to employ a polyarylate having an average molecular weight of from 5,000 to 100,000.

The butadiene copolymer to be used in the present invention is obtained by an addition of an unsaturated dicarboxylic acid anhydride to a copolymer of butadiene with at least one monomer selected from the group consisting of an aromatic monomer, an unsaturated nitrile monomer and an acrylate monomer. It is preferred that the number of moles of the unsaturated dicarboxylic acid anhydride to be added is within a range of from 0.3 to 2.0 times relative to that of an amino group in the resin composition. As the aromatic vinyl monomer, styrene, α-methylstyrene or p-methylstyrene may be employed, styrene is the most general. As the acrylate monomer, methyl methacrylate, ethyl methacrylate or ethyl acrylate may be employed.

The most general examples of such a butadiene copolymer include an acrylonitrile-butadiene-styrene copolymer (so-called ABS resin), a styrene-butadiene copolymer, a hydrogenated copolymer of styrene-butadiene and an acrylonitrile-butadiene copolymer.

The unsaturated dicarboxylic acid anhydride to add to the butadiene copolymer includes an α,β-unsaturated dicarboxylic acid anhydride of the formula:

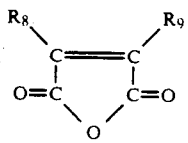

(IV)

wherein each of $R_8$ and $R_9$ is a hydrogen atom, a halogen atom or a hydrocarbon group, and an alicyclic carboxylic acid anhydride having a cis-form double bond in the ring. Specific examples of the α,β-unsaturated dicarboxylic acid anhydride of the formula IV include maleic anhydride, chloromaleic anhydride and citraconic anhydride. Specific examples of the acid anhydride other than the α,β-unsaturated dicarboxylic acid anhydride of the formual IV include itaconic anhydride, butenylsuccinic anhydride and tetrahydrophthalic anhydride. Specific examples of the alicyclic carbonxylic acid anhydride having a cis-form double bond in the ring include anhydrides of cis-4-cyclohexene-1,2-dicarboxylic acid, endo-bicyclo-[2,2,1]-5-heptene-2,3-dicarboxylic acid, methyl-endo-cis-bicyclo-[2,2,1]-1,2,3,4,7,7-hexachloro-2-heptene-5,6-dicarboxylic acid. If necessary, their functional derivatives such as dicarboxylic acids, metal salts, esters, amides or acid halides of the dicarboxylic acids may also be employed in combination. Among them, the most general unsaturated dicarboxylic acid anhydride includes maleic anhydride and endlo-bicyclo-[2,2,1]-5-heptene-dicarboxylic acid anhydride.

The method for copolymerizing an unsaturated dicarboxylic acid anhydride with a butadiene polymer includes a conventional so-called radical copolymerization, or by a method wherein at least one unsaturated monomer containing an acid anhydride is radical-grafted to a butadiene copolymer in the presence of a radical-forming agent, in the presence or absence of a solvent or dispersing medium. In a case where the graft reaction is conducted in a molten state, it is possible to obtain the desired product in a simplified method in an extremely short period of time by using a melt kneading machine such as an extruder, a kneader or a Banbury mixer.

The epoxy group-containing olefin copolymer to be used in the present invention is obtained by polymerizing at least one unsaturated glycidyl monomer with at least one olefin monomer. The type of the copolymer may be any one of a random copolymer, a block copolymer, a graft copolymer and an alternate copolymer. The unsaturated glycidyl monomer is a monomer having in its molecule an unsaturated bond copolymerizable with an olefin monomer and at least one epoxy group. Such an unsaturated glycidyl monomer includes, for example, an unsaturated glycidyl ether of the formula:

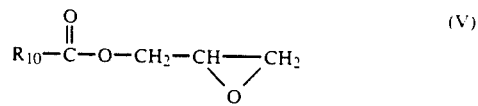

(V)

wherein $R_{10}$ is a hydrocarbon group having an olefin unsaturated bond; an unsaturated glycidyl ether of the formula:

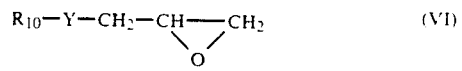

(VI)

wherein —Y— is —CH$_2$—O— or

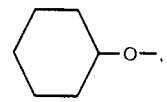

and $R_{10}$ is as defined with respect to the formula V; and an epoxy alkene of the formula:

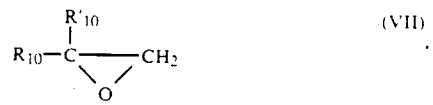

(VII)

wherein $R_{10}$ is as defined with respect to the formula V, and $R'_{10}$ is a hydrogen atom, a halogen atom or a hydroarbon group. Specifically, may be mentioned glycidyl acrylate, glycidyl methacrylate, monoglycidyl itaconate, diglycidyl itaconate, monoglycidyl butenetricarboxylate, diglycidyl butenetricarboxylate, triglycidyl butenetricarboxylate, glycidyl p-styrenecarboxylate, allylglycidyl ether, 2-methyllallylglycidyl ether, styrene-p-glycidyl ether, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinyl cyclohexene monoxide.

In the present invention, the olefin monomer copolymerized with the unsaturated glycidyl monomer to form an olefin copolymer may be any olefin monomer so long as it is capable of introducing an epoxy group to the molecule. However, it is preferably an olefin such as ethylene, propylene, butene-1, isobutylene, decene-1, octacene-1, or styrene; a vinyl ester such as vinyl acetate, vinyl propionate, or vinyl benzoate; an ester of acrylic acid or methacrylic acid with a saturated alcohol such as methyl alcohol, ethyl alcohol, propyl alcohol, butyl alcohol, 2-ethylhexyl alcohol, cyclohexyl alcohol, dodecyl alcohol, or octadecyl alcohol; a diester of maleic acid; a vinyl ether such as vinyl methyl ether or vinyl ethyl ether; an N-vinyl lactam such as N-vinyl pyrrolidone or N-vinyl caprolactam; or an acrylic acid amide compound. These olefin monomers, may be used alone or in combination as a mixture of two or more different kinds.

As the epoxy group-containing olefin copolymer for use in the present invention, an ethylene-glycidyl methacrylate copolymer, an ethylene-glycidyl acrylate copolymer, an ethylene-glycidyl methacrylate-vinyl acetate copolymer, and an ethylene-glycidyl acrylate-vinyl acetate copolymer are particularly preferably used.

The copolymerization ratio of the unsaturated glycidyl monomer in the epoxy group-containing olefin copolymer to be used in the present invention is usually from 0.05 to 95 mol %, preferably from 0.1 to 50 mol %.

In the impact resistant resin composition of the present invention, the proportion of the polyamide is preferably from 30 to 70% by weight. If it exceeds 70% by weight, the deterioration of the heat resistance is substantial, and if it is less than 30% by weight, the chemical resistance becomes poor.

The proportion of the polyarylate is preferably from 5 to 40% by weight. If it exceeds 40% by weight, no substantial improvement in the heat resistance is obtainable. On the other hand, the costs for materials merely increase, and if it is less than 5% by weight, both the heat resistance and the impact resistance substantially become poor.

The proportion of the butadiene copolymer obtained by an addition of an unsaturated dicarboxylic acid anhydride is preferably from 5 to 40% by weight. If it exceeds 40% by weight, the deterioration of the heat resistance is substantial. On the other hand, if it is less than 5% by weight, the effect to reduce the costs for materials is low.

The proportion of the epoxy group-containing olefin copolymer is preferably from 3 to 30% by weight. If it exceeds 30% by weight, the deterioration of the heat resistance is substantial, and if it is less than 3% by weigth, the effect to improve the impact strength is low.

To the resin composition of the present invention, additives such as heat stabilizers, antioxidants, photostabilizers, lubricants, pigments, flame retardants and plasticizers, may further be incorporated. Further, fiber reinforcing materials such as glass fiber, metal fiber, potassium titanate whisker or carbon fiber, or filler-type reinforcing materials such as talc, calcium carbonate, mica, glass flake or metal flake may also be incorporated. It is particularly preferred to incorporate glass fiber in an amount of from 10 to 50% by weight to the resin composition of the present invention, whereby not only the mechanical strength and heat resistance can be substantially improved, but also an improvement in the water resistance can be obtained, which is desirable to attain the object of the present invention.

Now, the present invention will be described in further detail by the following Examples and Comparative Examples. However, the present invention is by no means restricted to such specific Examples.

EXAMPLES 1 to 7 AND COMPARATIVE EXAMPLES 1 TO 4

100 parts by weigth of an acrylonitrile-butadiene-styrene copolymer (ABS resin k-2540, manufactured by Sumitomo Naugatuck), 2 parts by weight of maleic anhydride, and 0.7 part by weight of di-t-butylperoxide, and 100 parts by weight of the same copolymer as above, 3 parts by weight of endo-bicyclo-[2,2,1]-5-heptene-2,3-dicarboxylic acid anhydride and 0.7 part by weight of di-t-butylperoxide were mixed by a Henschell mixer at room temperature, respectively. The mixtures were supplied to a double screw extruder and extruded at 200° C. to obtain two kinds of copolymer which were adducts of the two kinds of the acid anhydride. They are referred to simply as ABS-MAH and ABS-HAH, respectively. Further, a non-treated copolymer is referred to simply as ABS.

Other components consituting the resin composition of the present invention were as follows:

Polamide: high-amino-group-concentration nylon6 (manufactured by Unitika Limited, amino group concentration 84 mol/$10^6$ g, relative viscosity: 2.1 as measured in 96% sulfuric acid at 25° C. at a concentration of 1 g/dl) and low-amino-group-concentration nylon6 (manufacutred by Unitika Limited, amino group concentration: 35 mol/$10^6$ grelative viscosity: 2.1 as measured in 96% sulfuric acid at 25° C. at a concentration of 1 g/dl).

Polyarylate: a bisphenol A/terephthalic acid/isophthalic acid copolymer (U-polymer, U-100, manufactured by Unitika Limited).

Epoxy group-containing olefin copolymer: an ethylene-glcidyl methacrylate copolymer (Bondfast E. manufactured by Sumitomo Chemical Co., Ltd.).

The components were mixed at the proportions as identified in Table 1, by a Henschell mixer at room temperature, and the mixture was dried at 80° C. under vacuum overnight, and melt-mixed by a double screw extruder at 270° C. to obtain pellets of a resin composition. The pellets thus obtained were injection-molded to obtain test pieces, which were then subjected to the measurement of physical properties. The results are shown in Table 1.

EXAMPLES 8 TO 10 AND COMPARATIVE EXAMPLE 5

Nylon 46 (manufactured by DSM, Holland, amino group concentration: 54 mol/$10^6$ g, relative viscosity: 2.3 as measured in 96% sulfuric acid at 25° C. at a concentration of 1 g/dl) as the polyamide and the same components as used in Examples 1 to 7 were used. These components were mixed at the proportions as identified in Table 2, and treated in the same manner to obtain test pieces, which were then subjected to the measurement of physical properties. The results are shown in Table 2.

TABLE I

| | Blending ratio by weight (%) | | | | | | | Izod[1] impact strength (Kg · cm/cm) | Heat[2] distortion temperature (°C.) |
|---|---|---|---|---|---|---|---|---|---|
| | High amino group concentration nylon 6 | Low amino group concentration nylon 6 | U-100 | ABS-MAH | ABS-HAH | ABS | Bondfast E | | |
| Example 1 | 40 | — | 20 | 35 | — | — | 5 | 31 | 132 |
| Example 2 | 40 | — | 20 | — | 35 | — | 5 | 30 | 131 |
| Example 3 | 40 | — | 15 | 35 | — | — | 10 | 46 | 127 |
| Example 4 | 40 | — | 15 | — | 35 | — | 10 | 44 | 126 |
| Example 5 | 50 | — | 20 | 25 | — | — | 5 | 51 | 128 |
| Example 6 | 50 | — | 10 | 30 | — | — | 10 | 55 | 125 |
| Example 7 | 40 | — | 10 | 30 | — | — | 20 | 70 | 124 |
| Comparative Example 1 | — | 40 | 20 | 35 | — | — | 5 | 12 | 131 |
| Comparative Example 2 | — | 40 | 15 | 35 | — | — | 10 | 9 | 126 |

TABLE I-continued

| | High amino group concentration nylon 6 | Low amino group concentration nylon 6 | U-100 | ABS-MAH | ABS-HAH | ABS | Bondfast E | Izod[1] impact strength (Kg·cm/cm) | Heat[2] distortion temperature (°C.) |
|---|---|---|---|---|---|---|---|---|---|
| Comparative Example 3 | 50 | — | 20 | — | — | 25 | 5 | 2 | 127 |
| Comparative Example 4 | 40 | — | 10 | — | — | 30 | 20 | 2 | 123 |

TABLE II

| | Nylon 46 | — | U-100 | ABS-MAH | ABS-HAH | ABS | Bondfast E | Izod impact[1] strength (Kg·cm/cm) | Heat[2] distortion temperature (°C.) |
|---|---|---|---|---|---|---|---|---|---|
| Example 8 | 40 | — | 20 | 35 | — | — | 5 | 46 | 163 |
| Example 9 | 40 | — | 20 | — | 35 | — | 5 | 42 | 163 |
| Example 10 | 40 | — | 10 | 40 | — | — | 10 | 57 | 138 |
| Comparative Example 5 | 40 | — | 20 | — | — | 35 | 5 | 3 | 162 |

EXAMPLES 11 TO 13

A nylon66 (Maranyl A 100, manufactured by ICI, amino group: 52 mol/$10^6$ g, relative viscosity: 2.7 as measured in 96% sulfuric acid at 25° C. at a concentration of 1 g/dl) as the polyamide, a polyarylate comprising bisphenol A and isophthalic acid relative viscosity: 1.6 as measured at 25° C. at a concentration of 1 g/dl in 1,1,2,2-tetrachloroethane/phenol=40/60), a hydrogenated adduct of a styrene-butadiene block copolymer with maleic anhydride (Craton G 1701X, manufactured by Shell Chemical Company) as the butadiene copolymer, and Bondfast E as used in Examples 1 to 7 as the epoxy group-containing olefin copolymer, were used and treated in the same manner to obtain test pieces, which were subjected to the measurement of physical properties. The results are shown in Table 3.

| | Nylon 66 | Polyarylate | Craton G1701X | Bondfast E | Izod impact[1] strength (Kg·cm/cm) | Heat distortion[2] temperature (°C.) |
|---|---|---|---|---|---|---|
| Example 11 | 40 | 40 | 10 | 10 | 30 | 152 |
| Example 12 | 50 | 40 | 5 | 5 | 21 | 157 |
| Example 13 | 50 | 30 | 15 | 5 | 42 | 146 |

[1]According to ASTM D256 method. ⅛ inch thickness, notched
[2]According to ASTM D648 method. load: 18.6 kg/cm²

As shown in Tables 1, 2 and 3, the resin composition of the present invention using the polyamide having a high amino group concentration and the butadiene copolymer obtained by an addition of an acid anhydride, exhibits excellent heat resistance and impact resistance. Whereas, in the case of a resin composition using a polyamide having a low amino group concentration and a butadiene copolymer to which an acid anhydride is not added, the impact resistance deteriorates substantially.

What is claimed is:

1. A resin composition which comprises
   A. from 30 to 70% by weight of a polyamide containing at least 40 mole/$10^6$ g of amine end groups,
   B. from 5 to 40% by weight of a polyarylate,
   C. from 5 to 40% by weight of copolymer of butadiene with at least one monomer selected from the group consisting of an aromatic-vinyl monomer, an unsaturated nitrile monomer and an acrylate monomer, which copolymer is addition grafted with an unsaturated dicarboxylic acid anhydride, and
   D. from 3 to 30% by weight of an epoxy-group containing olefin copolymer obtained by polymerizing at least one unsaturated glycidyl monomer with at least one unsaturated olefin monomer.

2. The resin composition according to claim 1, wherein the polyamide is one member or a mixture of two or more members selected from the group consisting of nylon 6, nylon 66 and nylon 46.

3. The resin composition according to claim 1, wherein the polyarylate is obtained from a bisphenol, terephthalic acid and isophthalic acid.

4. The resin composition according to claim 1, wherein the butadiene copolymer is a graft product of maleic anhydride or endo-bicyclo-[2,2,1]-5-heptene-2,3-dicarboxylic acid anhydride.

5. The resin composition according to claim 1, wherein the epoxy group-containing olefin copolymer is an ethylene-glycidyl methacrylate copolymer or an ethylene-glycidyl acrylate copolymer.

6. The resin composition according to claim 1, wherein the epoxy group-containing olefin copolymer is an ethylene-glycidyl methacrylate-vinyl acetate copolymer or an ethylene-glycidyl acrylate-vinyl acetate copolymer.

* * * * *